US009451486B2

United States Patent
Fonseca Dos Santos et al.

(10) Patent No.: US 9,451,486 B2
(45) Date of Patent: Sep. 20, 2016

(54) PERFORMING MEASUREMENTS IN A DIGITAL CELLULAR WIRELESS TELECOMMUNICATION NETWORK

(75) Inventors: Andre Fonseca Dos Santos, Stuttgart (DE); Edgar Kuehn, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 212 days.

(21) Appl. No.: 14/127,612

(22) PCT Filed: Jun. 12, 2012

(86) PCT No.: PCT/EP2012/061049
§ 371 (c)(1),
(2), (4) Date: Dec. 19, 2013

(87) PCT Pub. No.: WO2012/175362
PCT Pub. Date: Dec. 27, 2012

(65) Prior Publication Data
US 2014/0146700 A1    May 29, 2014

(30) Foreign Application Priority Data
Jun. 24, 2011 (EP) .................................... 11290284

(51) Int. Cl.
*H04W 24/08* (2009.01)
*H04W 16/14* (2009.01)

(52) U.S. Cl.
CPC ............. *H04W 24/08* (2013.01); *H04W 16/14* (2013.01)

(58) Field of Classification Search
None
See application file for complete search history.

(56) References Cited

U.S. PATENT DOCUMENTS

| 7,826,837 B1* | 11/2010 | Sylvester | H04W 24/06 455/423 |
| 2005/0153659 A1* | 7/2005 | Lee | H04B 7/0617 455/67.13 |
| 2008/0207195 A1* | 8/2008 | Ranta | H04W 24/10 455/423 |
| 2009/0286497 A1 | 11/2009 | Akkarakaran et al. | |

(Continued)

FOREIGN PATENT DOCUMENTS

| CN | 101282317 A | 10/2008 |
| CN | 102037665 A | 4/2011 |

(Continued)

OTHER PUBLICATIONS

International Search Report for PCT/EP2012/061049 dated Sep. 6, 2012.

(Continued)

*Primary Examiner* — Faruk Hamza
*Assistant Examiner* — Cassandra Decker
(74) *Attorney, Agent, or Firm* — Fay Sharpe, LLP (57) ABSTRACT

A method for performing measurements in a digital cellular wireless telecommunication network is provided. An embodiment of the method includes determining free resources of a set of cells of the telecommunication network, determining a subset of the plurality of mobile devices, setting the subset of the plurality of mobile devices into a probing mode, determining the location of the subset of mobile devices in the probing mode, exchanging test signals between the mobile devices in the probing mode and the base stations of the set of cells, performing a plurality of measurements of signal strengths and/or signal powers of the test signals, determining average values from the plurality of measurements, and storing the average values of the plurality of measurements to provide a result of the measurement.

22 Claims, 4 Drawing Sheets

(56) References Cited

U.S. PATENT DOCUMENTS

| | | | | |
|---|---|---|---|---|
| 2010/0202554 A1* | 8/2010 | Kramer | H04L 25/0224 | 375/285 |
| 2010/0325267 A1 | 12/2010 | Mishra et al. | | |
| 2011/0207468 A1* | 8/2011 | Nakamura | H04W 52/0274 | 455/450 |
| 2012/0182874 A1* | 7/2012 | Siomina | H04W 56/004 | 370/241 |
| 2012/0282938 A1* | 11/2012 | Yamato | H04W 24/02 | 455/450 |
| 2013/0003591 A1* | 1/2013 | Novak | H04W 36/06 | 370/252 |
| 2014/0038630 A1* | 2/2014 | Kallin | H04W 24/08 | 455/452.1 |
| 2014/0094180 A1* | 4/2014 | Zhou | H04W 40/30 | 455/445 |
| 2014/0369336 A1* | 12/2014 | Prakash | H04W 16/18 | 370/338 |

FOREIGN PATENT DOCUMENTS

| | | | | |
|---|---|---|---|---|
| EP | 2 334 113 A1 | 6/2011 | | |
| JP | WO 2010050320 A1 * | 5/2010 | | H04W 52/0274 |
| WO | 2006062994 A2 | 6/2006 | | |

OTHER PUBLICATIONS

PCT Pat App No. PCT/EP2012/061049, Written Opinion of the International Searching Authority, Mailed Sep. 6, 2012, 3 pp.

European Pat App No. 11290284, Extended European Search Report, Mailed Dec. 14, 2011, 4 pp.

English Bibliography for Chinese Patent Application Publication No. CN102037665A, published Apr. 27, 2011, printed from Thomson Innovation on Aug. 10, 2016, 4 pp.

English Bibliography for Chinese Patent Application Publication No. CN101282317A, published Oct. 8, 2008, printed from Thomson Innovation on Aug. 10, 2016, 3 pp.

* cited by examiner

PERFORMING MEASUREMENTS IN A DIGITAL CELLULAR WIRELESS TELECOMMUNICATION NETWORK

The invention relates to the field of mobile telecommunication, in particular to performing measurements in a digital cellular wireless telecommunication network.

Self Organized Networks (SON) are networks that are able to self-configure and self-optimize its operation with respect to parameterized targets, such as throughput, coverage, handover quality, energy consumption, etc. . . .

The optimization algorithms that run in the network base their decisions on measurements and contexts, such as user location, channel state information, user density, and user mobility profile. The extraction of the context in the network is based on measurements performed by the mobile and network infrastructure during the network and users operation. It is a challenging task because of e.g. processing effort in mobile and network, signaling overhead on the air interface and energy consumption in the mobile.

The ability of the network to handle the context depends on the reliability of such measurements, which is very dependent on the frequency that they are updated. Furthermore, in current proposals the mobile devices are able perform measurements based on the current network configuration. That is to say that a mobile device is able to measure signal quality at the resources (i.e. base station, frequency, time, spreading code) that are currently assigned to the mobile and with a limited scope also on resources in neighbor cells.

SUMMARY

In this invention we propose a method, a network mode, and a signaling strategy that allows the inference of contexts such as SINR in alternative network configurations and additionally speeds up the network process of learning.

It is an object of the present invention to provide an improved method for performing measurements in a in digital cellular wireless telecommunication network, an improved central network entity, an improved base station and improved computer program products. These objects are achieved by the features of the independent claims. Embodiments of the invention are described in the dependent claims.

The invention relates to a method for performing measurements in a digital cellular wireless telecommunication network. First free resources of a set of cells of the telecommunication network are determined or resources are freed for that purpose. The set of cells comprises a plurality of mobile devices. The free resources are usable for exchanging data between base stations of the set of cells and the plurality of mobile devices. In other words, the free resources may be used for example for telephone conversations, internet connections or other data connections.

A subset of the plurality of mobile devices is determined and the subset is set into a probing mode. For example the subsets may be asked by the base station if they are available for the probing mode. The subset of mobile devices could for example accept or deny being switched into the probing mode. Subsequently the location of the subset of mobile devices is determined. This could be for example performed by data of a satellite navigation system such as GPS or Galileo. Another possibility to determine the location could be to use network-based positioning methods.

Test signals are exchanged between the mobile devices in the probing mode and the base station of the set of cells. The location of the subset of mobile devices could be evaluated before exchanging test signals or with the support of the test signals during the probing mode. The test signals comprise first and second pilot signals. The first pilot signals are orthogonal to the second pilot signals. The test signals are exchanged by using the free resources. It is to be noted that more than two kinds of pilot signals can be exchanged. However, each set of pilot signals should be orthogonal to the other pilot signals used for exchanging the test signals. Using orthogonal pilot signals is advantageous because it can be simply calculated how the test signals would have been exchanged if for example the first or the second pilot signals would not have been transmitted. In this way it could be easily simulated which affects it would have if for example one of the base stations of the set of the cells would be switched off. In this way it could be easily determined how the cell coverage of the neighboring cells of this switched off cell would change and how the free resources in the neighboring cells of the switched off cell would be affected by switching off that cell.

The idea here is to create a probing mode in the network, where users are demanded by the network to exchange pre-defined test signals with the surrounding base stations at the available free data resources. Preferably, it opportunistically exploits the instances when the network is not fully loaded for the inference of free resources. As an instance, at the night period when most of the users are in idle mode the network can send test/pilots signals to the users and they can report back the measurements. Similarly, the users can transmit test signals to the surrounding base stations in order the base stations are able to measure uplink states. Notice that the network can probe also alternative configurations and resource allocation schemes at this period. This information can be used first to calculate an optimum mobile to cell association for the immediately following scheduling period so that as much as possible energy can be saved by either blanking off of unneeded cells or using intelligent resource allocation methods. Secondly, the measurements results are associated with mobile location information that can be obtained by GPS, by network based positioning methods or even be estimated with the support of the test signals during the probing phase.

A plurality of measurements is performed concerning signal strengths and/or signal powers of the test signals. From the plurality of measurements an average value is determined and stored to provide a result of the measurement. It is to be noted that not only the average or otherwise preprocessed value from the plurality of measurements could be stored but also every single result of every single measurement. This could be advantageous for performing a mathematical analysis of the measurement results such as the variance.

A signaling protocol allows the exchange of the results to one or more centralized entities in the network that contain such measurements results in a statistically processed form in a database, e.g. as so-called X-map. Alternatively, the information/database can be exchanged in a distributed manner among the base stations. From this data, mean SINR estimates per user for a distinct spatial distribution of mobiles within the regarded neighborhood area can be made to evaluate alternative network configurations with cells switched off for energy saving reasons. Subsequently, an improved network configuration with respect to energy consumption can be selected and configured. Compared to the solution described in the previous paragraph, this method is based on averaged measurements possibly collected over a longer time frame from several mobiles located in the vicinity of a certain location. So, these data do not reflect the actual channel condition of a certain mobile for a distinct network configuration. However, they reflect the achievable SINR on basis of a statistical average and can therefore be beneficially applied for calculating optimized network configurations with base stations switching off on a longer time scale.

According to embodiments of the invention the stored average values are used for predicting an effect of switching off at least one cell of the set of cells or switching at least one cell of the set of cells from an operation mode into a sleep mode. The base station of the at least one cell consumes in sleep mode less energy than in operation mode. Predicting the effect comprises determining a first amount of resources needed in neighboring cells of the at least one cell for serving the mobile devices of the at least one cell, if the at least one cell would be switched off or switched into the sleep mode. Determining the first amount is performed by using the average values. In other words the average values can be used for predicting what effect it would have if the at least one cell would be switched off or switched into the sleep mode. This is possible because of the orthogonality of the pilot signals of the test signals. Because of the orthogonality of the pilot signals it is easy to calculate the resulting pilot signals if one set of pilot signals would be switched off.

It is advantageous to perform the calculating or the predicting step with the average values because the average values are statistically more reliable than single values.

A second amount of resources is determined. The second amount of resources comprises all free resources of the neighboring cells of the at least one cell. Additionally a coverage area of the at least one cell is determined. Then it is determined whether the neighboring cells of the at least one cell would cover at least a part of the coverage area when the at least one cell is switched off by using the average values. The part is defined by mobile devices in the at least one cell having established a communication connection to the base station of the at least one cell. In a system according to the LTE standard (long term evolution) the part is defined by all mobile devices in the at least one cell being switched on, comprising idle mobile devices and devices exchanging data with the base station. In a network according to the BCG[2] (Beyond Cellular Green Generation) standard the part is defined by mobile devices in the at least one cell that exchange data with the base station of the at least one cell. In this case the part does not comprise idle mobile devices. According to the BCG[2] standard there are signaling base stations and database stations. The signaling base stations are always switched on, while the database stations are switched off when there is no traffic in the respective cell. It is to be noted that the sleep mode according to embodiments of the invention of the cell could be a sleep mode according to the BCG[2] standard. A cell in the sleep mode would switch off in this case its database station and only have switched on the signaling base station. Thereby the energy consumption of the base station would be reduced.

The at least one cell is switched off or switched into the sleep mode if the second amount of resources comprises more resources than the first amount of resources and if the neighboring cell covers at least the part of the coverage area. In other words the at least one cell is only switched off or switched into the sleep mode if the connections of the mobile devices being located in the coverage area of the at least one cell can be taken over by the neighboring cells. It is to be noted that the mobile devices being located in the coverage area of the at least one cell could need more resources when the at least one cell is switched off or switched into the sleep mode because of the longer distance between the mobile devices and the base stations of the neighboring cells. This will lead to a higher path loss. Hence, more resources would be needed for guaranteeing the same data throughput.

Special focus is on achieving high spectral efficiency and energy efficiency within the mobile radio network, especially with respect to reduction of energy consumption in low traffic hours. Target is to achieve an optimum assignment of active users in order to allow for different energy saving mechanisms like blanking off the radio transmission of a distinct cell on a short time scale or even to switch of a complete base station on a longer time scale.

It is to be noted that the coverage area of the neighboring cells would also change when the at least one cell is switched off. This can be also predicted or calculated by using the average values of the plurality of measurements.

According to embodiments of the invention the plurality of measurements are performed for sub-carriers and time slots of the telecommunication network. The resources mentioned above are also according to embodiments of the invention sub-carriers and time slots. In other words, sub-carriers are frequency ranges and time slots are periods of times during which data may be exchanged between a base station and a mobile device.

According to embodiments of the invention the subset of the plurality of mobile devices is set into probing mode by transmitting a request for setting the subset of mobile devices into the probing mode to the subset of mobile devices. Then it is determined if the probing mode is accepted by each of the mobile devices. This may for example be performed by each of the mobile devices itself. For example the mobile devices may deny being switched into the probing mode because of their battery load or because the user does not want to let his mobile device being switched into the probing mode.

The mobile devices that have determined to accept the probing mode transmit an acknowledgement of the probing mode to the base station. These mobile devices that have transmitted the acknowledgement are switched into the probing mode. The mobile devices that transmit a denial or no answer to the request will not be switched into the probing mode according to embodiments of the invention.

According to embodiments of the invention each of the mobile devices determines if the probing mode is accepted by taking into account its respective battery load.

According to embodiments of the invention the average values are stored in a central network entity. The central network entity performs the prediction of the effect of switching off the at least one cell of the set of cells or switching the at least one cell of the set of cells from an operation mode into the sleep mode.

According to embodiments of the invention the average values are stored together with measurement results of the plurality of measurements, cell identifiers of the set of cells, received signal powers of the mobile devices at the base stations of the set of cells. Additionally information about how many measurements have been performed for determining the average values may also be stored. The average values are preferably not used for predicting the effect of switching off the at least one cell of the set of cells or switching the at least one cell of the set of cells from the operation mode into the sleep mode if the number of measurements is below a reliability value for the respective locations. The reliability value may be set by an operator for example. The reliability value ensures that the predicting step is only performed for the case when reliable average values are available for performing the predicting step. Also traffic loads for each cells of the set of cells may be stored and maximum traffic loads for each cell of the set of cells. All this stored information is advantageous to be used for performing the predicting step.

Suppressing predictions based on non-reliable average values is preferably performed for a decentralized approach and for a centralized approach comprising a central network entity. The average values and optionally the additional information mentioned above may be stored in a plurality of base stations in the decentralized approach or in the central network entity in the centralized approach.

According to embodiments of the invention the average values and the above mentioned additional information are stored in the base stations of the set of cells. Each of these base stations is preferably adapted to coordinate among these base stations. It is to be noted that one base station does not coordinate every base station of the whole telecommunication network. The set of cell comprises for example 2-20 base stations, preferably 2-5 base stations. Coordinating means in this context that the coordinating base station is adapted to retrieve data from the storages of the other base stations and to instruct other base stations by transmitting signals of performing steps of the method according to embodiments of the invention.

According to embodiments of the invention the average values are stored in base stations corresponding to the set of cells. The base stations perform the prediction of the effect of switching off the at least one cell or switching the at least one cell from the operation mode into the sleep mode.

According to embodiments of the invention determining the location of the plurality of mobile devices in the probing mode is performed by using satellite navigation data and/or by positioning methods based on data of the telecommunication network. It is to be noted that the data of the telecommunication network could also be the test signals being exchanged during the probing mode.

According to embodiments of the invention the set of cells is determined dynamically. In other words not for every measurement the same set of cells is chosen. For example for a first measurement the cells 1, 2 and 3 could be used while for a second measurement the cells 2, 4 and 5 are used and for a third measurement the cells 1, 3 and 5.

According to embodiments of the invention the set of cells is determined statically. This means that the measurements are performed always for the same set of cells. For example a first plurality of measurements is performed for the cells 1, 2 and 3 while a second measurement is always performed for the cells 4, 5 and 6.

Another embodiment of the invention comprises the following steps:
1. Network is currently operating on such a load that Nu resources are used and Nf are free. By resources we refer to subcarriers, time slots, spreading codes, base stations, etc.;
2. The network receives the order from the operator to enter in a probe mode in a certain region. This can be defined by the operator for example or an algorithm can define when the right time to do that. This will be dependent on the quality of the results already obtained and on the changes at the environment along time (e.g. building constructions, new hot spot area).
3. The network broadcasts a request signal to all mobile devices for entering in probing mode. A mobile device can for example be any device such as a cell phone, a tablet, a notebook, etc. . . .
4. Each mobile device checks parameters such as battery state in order to decide if it accepts the requests;
5. A set of mobile devices Ma accepts the request and sends their ID with a feedback signal to the network via the control channel indicating acceptance. Additionally, some location information (e.g. cell ID) is sent from the mobiles to the base stations;
6. The network compares the current set of available mobiles Ma with its database containing the previous measurements results;
7. The network decides among the Ma mobiles what the subset of mobiles M' is that it wants to test now. For instance the network might not be interested in running tests in mobiles that are currently in a position with well known behavior. On the other hand, the network might want to infer mobiles that are in areas that have not enough measurements results yet.
8. A predefined sequence of pilot signals is transmitted from a set of Base Stations to the mobiles. Additionally, the base stations inform the mobile devices of the index of the pilot sequences they should look at.
9. The mobile devices run measurements based on the received sequences and reports back the results to the base stations. Additionally, the mobile sends an indicator for the reliability of the measurements and its location. The location information is obtained by GPS, by network based positioning data, or the mobile devices can use the test signals for location estimation. Furthermore, other localization methods can be utilized.
10. The information received from the mobile devices (e.g. measurements results, measurement reliability and location) is stored in a database in the network with the support of a signaling protocol.
11. Uplink test signals can be also broadcasted from the mobiles to the base stations in order the base stations can infer the uplink channel.
12. The base stations send the updated information to a central network entity in the network where a database is stored. Alternatively, this information can be spread throughout the neighbor base stations.

In another aspect the invention relates to a central network entity for a digital cellular wireless telecommunication network. The central network entity may for example comprise means for determining free resources of a set of cells of the telecommunication network. The set of cells comprises a plurality of mobile devices and the free resources are usable for exchanging data between base stations of the set of cells and the plurality of mobile devices. Further, the central network entity may comprise means for determining a subset of the plurality of mobile devices and means for setting the subset of the plurality of mobile devices into a probing mode.

Furthermore, the central network entity may comprise means for determining the location of the plurality of mobile devices in the probing mode and means for exchanging test signals between the mobile devices being in probing mode and the base stations of the set of cells. The test signals comprise first and second pilot signals. The first pilot signals are orthogonal to the second pilot signals and the test signals are exchanged by using the free resources.

The central network entity may also comprise means for performing a plurality of measurements of signal strengths and/or signal powers of the test signals, means for determining average values of the plurality of measurements, and means for storing the average values of the plurality of measurements.

In another aspect the invention relates to a base station for a cell of a digital cellular wireless telecommunication network. The cell belongs to a set of cells and the base station comprises means for determining free resources of the set of cells of the telecommunication network. The set of cells comprises a plurality of mobile devices. The free resources are useable for exchanging data between base stations of the set of cells and the plurality of mobile devices. The base station further comprises means for determining a subset of the plurality of mobile devices and means for setting the subset of the plurality of mobile devices into a probing mode. The base station also comprises means for determining the location of the plurality of mobile devices in the probing mode and for exchanging test signals between the mobile devices being in probing mode and the base stations of the set of cells. The test signals comprise first and second pilot signals. The first pilot signals are orthogonal to the second pilot signals and the test signals are exchanged by using the free resources.

Further, the base station comprises means for performing a plurality of measurements of signals strengths and/or signal powers of the test signals, means for determining average values of the plurality of measurements, and means for storing the average values of the plurality of measurements.

In yet another aspect the invention relates to computer program products comprising instructions executable by a base station and/or a central network entity of a digital cellular wireless telecommunication network that cause the base station and/or the central network entity to perform a method according to embodiments of the invention.

DETAILED DESCRIPTION

Like numbered elements in these Figs are either identical elements or perform the same function. Elements which have been discussed previously will not necessarily be discussed in later Figs if the function is identical.

Figure 1:
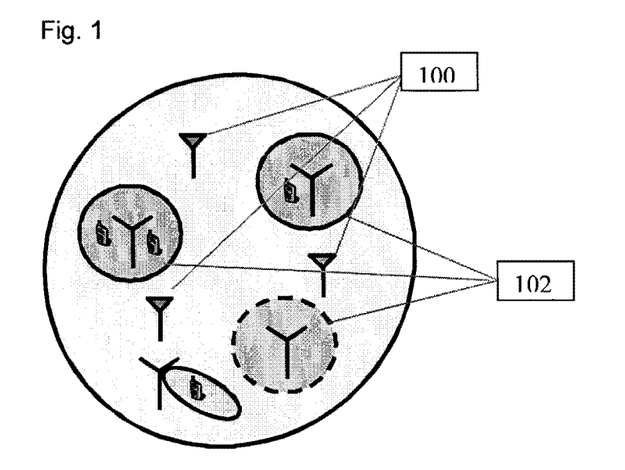
FIG. 1 is a schematic view of a network according to the BCG$^2$ architecture.

FIG. 1 is a schematic view of a digital cellular network according to the BCG$^2$ standard (beyond cellular green generation networks). The network comprises a signaling network 100 and a data network 102. Both the signaling network 100 and the data network 102 comprise a plurality of base stations. The base station of a certain cell can be switched into sleep mode. In sleep mode the base station of the data network 102 is switched off and only the base station of the signaling network 100 is operating. This may be performed when no data connections or telecommunication connections are active between a mobile device in the cell and the base station. Thereby the energy consumption of the respective base station is reduced.

Figure 2:
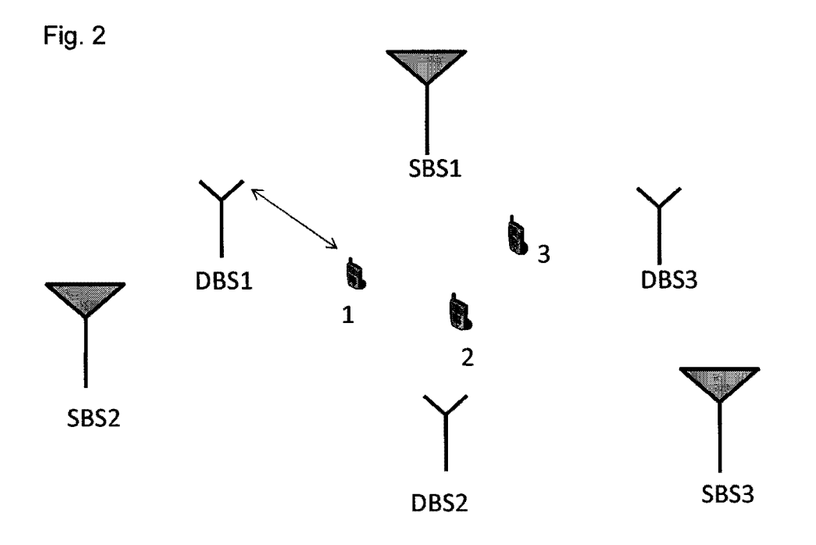
FIG. 2 is a schematic view of mobile devices being located in a digital cellular network according to the BCG$^2$ architecture.

FIG. 2 is a schematic view of three mobile devices being located in a digital cellular network according to the BCG$^2$ standard. For example the mobile device 1 communicates with database station 1 DBS with database station DBS 1. Communication may comprise exchanging data such as internet data or performing a telephone connection. The mobile devices 2 and 3 are in idle mode. Mobile device 2 is located in cell of the database station DBS 2 and the mobile device 3 is located in the cell of database station DBS 3. Each database station DBS 1-3 has a corresponding signaling base station SBS 1-3. For example the base stations 2 and 3 may be switched into sleep mode. In sleep mode the database stations DBS 2 and DBS 3 are switched off while the signaling base stations SBS 2 and SBS 3 are still in operating mode. Thereby the idle devices 2 and 3 are still connected to the network and may receive or initiate telecommunication connections. If a telecommunication connection is for example initiated by mobile device 2 or 3 the database station 2 or 3 is switched on and the respective cell is switched into operation mode.

Consider the scenario in FIG. 1. Independent signaling and data networks are employed. The main idea is to allow freedom of adaptation in the data network, e.g. to switch off base stations, but still to guarantee coverage by the signaling base stations. Therefore, the signaling network is designed for low data rate and reliable transmission in order to be able to page users that are currently in areas of a switched off base stations. On the other hand the user is always able to reach the network via the signaling network. In this way, it is a very flexible architecture that allows adaptation of the energy consumption with the load variation along the day. This comes with new challenges for the network. One immediate issue is the need of inferring the channel state between users and base stations are switched off. Such inference is needed in order the network can decide if the base station should remain off or if it has to be switched on.

The example here illustrates how the probing mode can support such decisions and to provide input for the network management algorithm. A simplified instance of the network is depicted in FIG. 2. For the sake of simplicity a central controller is assumed here. There the measurements database is stored and the network management decisions taken. Here, 3 users are in the system and only User 1 is currently active. Since only user 1 is active, only the Data Base Station 1(DBS1) is switched on and DBS2 and DBS3 are switched off. Users 2 and 3 can still be paged by the Signaling Base Stations (SBSs). Furthermore, users 2 and 3 can also request a voice or data connection via the SBSs. Now, assuming the scenario where users 2 and 3 remain in idle mode and network is interested in probing the network, the following steps are taken:

1. The network observes that it is currently operating on a low load regime. Then, it is decided that it will enter in the probe mode.
2. A central controller sends demands BS2 and BS3 to wake up and to operate in probing mode.
3. The SBSs broadcasts a signal requesting the mobiles to enter in probe mode.
4. Mobile devices 2 and 3 check its current parameters, e.g. battery level, probe mode grants, and they accept to enter in probe mode.
5. The mobile devices send a signal to the SBS accepting the request. Additionally, the mobiles that have GPS data send its location information to the SBSs. The position of the mobiles that do not have GPS data is determined e.g. by the radio fingerprint of the uplink signal.
6. The controller decides that it wants to probe mobile devices 2 and 3. The reasons for deciding to probe mobile devices 2 and 3 are various, e.g. modification in the environment, not enough measurements obtained in this locations yet.
7. BS1 sends to a central controller the information regarding the resources allocated to user 1. The central controller allocates test signals for BSs 1, 2 and 3 in resources that do not overlap with the current transmission of user 1 (see FIG. 3).
8. SBSs broadcast control signals to the mobile users informing the resources and the index of the pilot sequences that will be used for the measurements;
9. Users 1, 2, and 3 perform the measurements on the link quality and stores it.
10. When it is jointly decided by the network, such measurements are uploaded from the mobiles to the active BSs that send the information to a central controller.

Figure 3:
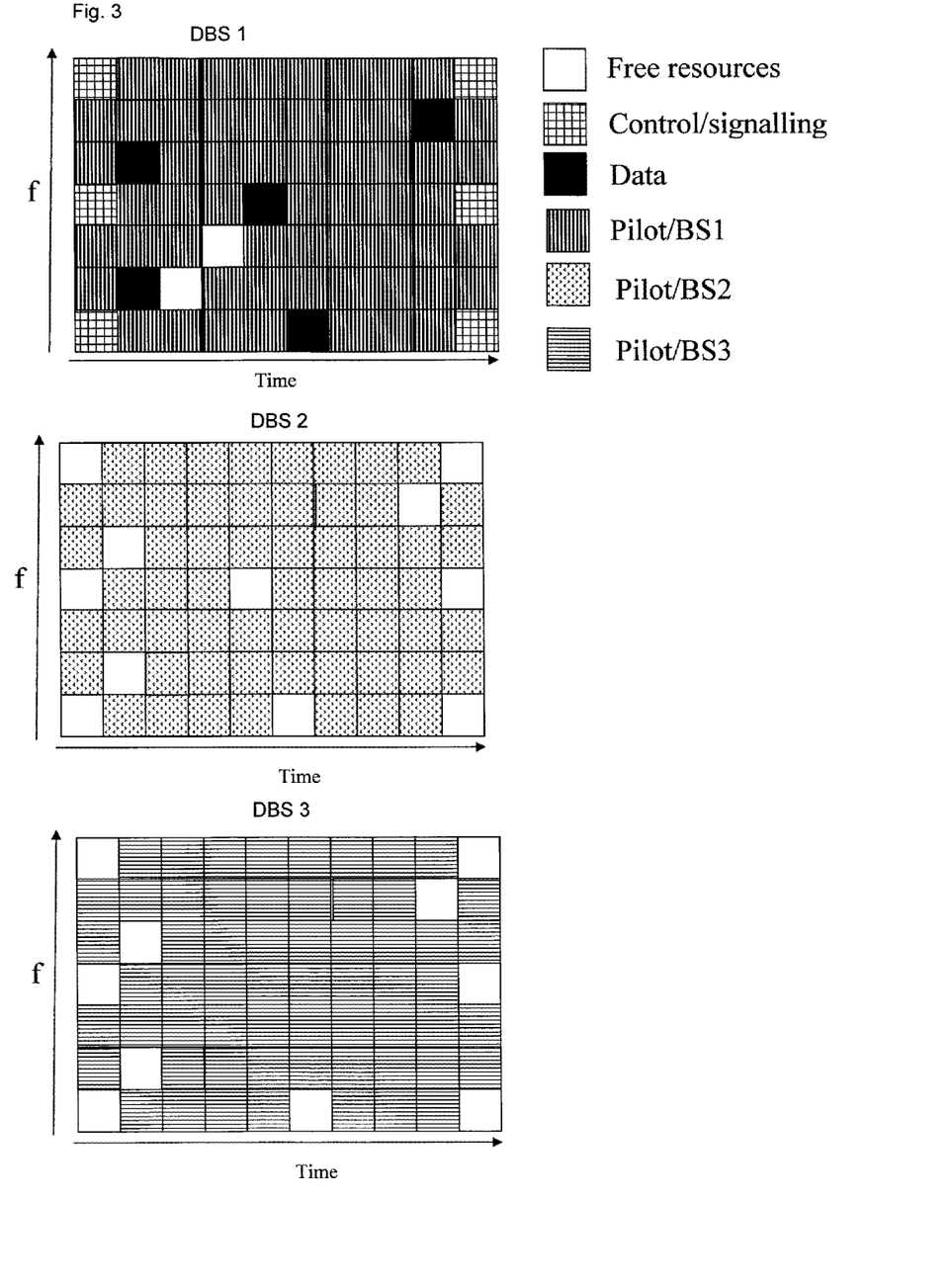
FIG. 3 is a schematic view of OFEM frames from users in uplink.

FIG. 3 is a schematic view of resources of an OFDM system. OFDM means orthogonal frequency division multiplexing. Three diagrams of OFDM frames are shown. The first diagram corresponds for example to DBS 1 of FIG. 2, the second diagram corresponds for example to DBS 2 of FIG. 2 and the third diagram corresponds to DBS 3 of FIG. 2. DBS 1 is in operation mode and some resources are used for exchanging data with mobile device 1 of FIG. 2. The depicted resources comprise resource blocks that each correspond to a certain sub-carrier in a certain time slot. A sub-carrier may also be referred to as a frequency range. In DBS 1 two resource blocks are free resources. Five resource blocks are used for data connections, for example for data connections with mobile device 1 of FIG. 2. Six resource blocks are used for control and/or signaling purposes. The rest of the resources of DBS1 can be used for exchanging test signals with mobile devices in the probing mode, e.g. mobile device 1.

DBS 2 and DBS 3 each have five resource blocks are free resources. The free resource blocks of DBS 2 and DBS 3 correspond to the resource blocks used for data connections of DBS 1. Thereby interferences between the data connections of DBS 1 with connections of DBS 2 and DBS 3 are avoided. Mobile devices 2 and 3 of base stations DBS 2 and 3 may exchange test signals in the probing mode with the base stations DBS 2 and DBS 3. All free resources of DBS 2 and DBS 3 may be used for this purpose.

To further detail the measurement process, the transmitted sequences are composed in such a way that the following property is fulfilled:

$$\begin{cases} \sum_t \sum_f t_{f,t}^{(u)} t_{f,t}^{(l)*} = 1, & \text{if } u = l \\ \sum_t \sum_f t_{f,t}^{(u)} t_{f,t}^{(l)*} = 0, & \text{if } u \neq l \end{cases}$$

Where, $t_{f,l}$ the pilot sequence in a selected resource (subcarrier and time slot). Basically this property means that the pilot sequences are orthogonal. One example for such pilots would be the CAZAC sequences from LTE or Hadamard codes from CDMA. Now consider the example in FIG. 3, where the OFDM frames from the DBS are shown.

The received signal by user k is given by:

$$r_{f,t}^{(k)} = D_{f,t}^{(1)} h_{1,k} + t_{f,t}^{(2)} h_{2,k} + t_{f,t}^{(3)} h_{3,k} + n_{f,t}$$

Where, D refers to the data of user 1, and $h_{n,k}$ to the channel between base station n and user k. n is the noise received by user k. Therefore, the average path-loss between BS n and user k can be estimated as:

$$\sum_t \sum_f r_{f,t}^{(k)} t_{f,t}^{(n)*} = |\bar{h}_{n,k}|^2$$

The user sends a quantized version of the measured path loss to its closed base station. Based on the measured path-losses, the network is able to predict the SINR of different configurations. Some examples are shown here:
I) The SINR at BS1 when BSs 2 and 3 are also on:

$$SINR_1 = \frac{P_1 |\bar{h}_{1,k}|^2}{P_2 |\bar{h}_{2,k}|^2 + P_3 |\bar{h}_{3,k}|^2 + \sigma_w^2};$$

II) The SINR at BS1 when BS 2 is on and when BS3 is in sleep mode:

$$SINR_1 = \frac{P_1 |\bar{h}_{1,k}|^2}{P_2 |\bar{h}_{2,k}|^2 + \sigma_w^2};$$

Here, the AWGN noise power $\sigma_w^2$ is assumed to be known since this is a characteristic of the BS hardware. The powers of the BSs are denoted as $P_1$, $P_2$ and $P_3$, respectively.

Figure 4:
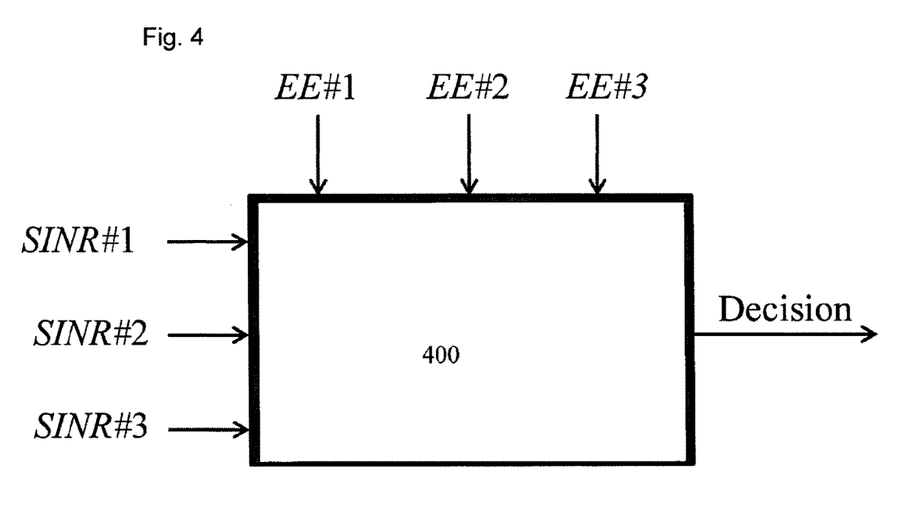
FIG. 4 is a schematic view of input parameters for predicting the effect of switching off a cell or switching a cell into sleep mode.

FIG. 4 is a schematic view of input parameters for determining the effect to the digital cellular wireless telecommunication network if a cell would be switched off or would be switched into sleep mode. The input parameters are calculated by using average values determined from the measurements performed in the probing mode. For example input parameters could be signal to interference and noise ratios SINR #1-3 and energy consumption indexes EE#1-3 corresponding to the base stations 1-3. The network management 400 determines based on these input parameters if a cell should be switched off or switched into sleep mode. The advantageous energy savings may be compared for example to the signal to interference and noise ratios. If a lot of energy could be saved by switching off one base station or switching one base station into the sleep mode and the signal to interference and noise ratio would increase only slightly in each of the other cells the network management 400 may decide to switch this cell into the sleep mode or switch this cell off. If the network management determines that only a low amount of energy would be saved when the base station would be switched off or switched into the sleep mode and a high increase in the signal to interference and noise ratio would result the base station is not switched off or switched into the sleep mode.

It is important to note that the network management 400 decides to switch off a cell or switch a cell into the sleep mode based on predicting the effects to the total network or only to the neighboring cells by using the average values. Because the test signals are exchanged by using orthogonal pilot symbols it can be easily calculated how switching off a base station or switching a base station into the sleep mode would affect signal to interference and noise ratio in other neighboring cells.

The estimated SINR can be exploited as in FIG. 4. The network management algorithm bases its decision on the SINR of possible network configurations and the energy consumption of such configurations. The energy consumption can be predetermined if known, or it can be estimated using the method described in European Patent application 11290107.9. An optimization/learning algorithm then defines what the best network architecture to be employed is, i.e. which base stations have to be switched on or off.

In case the mobile has a transmitter and the base station a receiver able to operate on the downlink frequency, the probing mode can be defined by transmitting sequences along the whole spectrum (uplink and downlink on an uplink direction. In this way, the downlink SINR or channel can be estimated by channel reciprocity.

In order to decide about alternative network configurations in which cells are switched off totally or partially (e.g. reduced bandwidth) for energy saving reasons, two criteria have to be considered in LTE systems (e.g. in a conventional system, where no overlaying SBS is existing as in the previous embodiment). First, coverage has to be maintained within the concerned area. This means that data transmission and RRC signaling for setting up mobile terminated and mobile originated calls and/or services and for performing handover must be feasible. Secondly, as an even harder requirement, network capacity for data transmission must not be reduced below that what is actually required from offered traffic point of view.

Assuming as first example a low traffic situation with all cells of a mobile network being in operation mode. The energy saving task would be to select cells which can be switched off without violating the two criteria mentioned above, i.e., the two criteria mentioned above have to be checked in advance. The resources a cell has to afford for serving a distinct user demanding a certain data rate depends strongly on the radio link quality between mobile devices and base station. So, the criteria have to be evaluated for the planned network configuration, i.e. taking into account the location of the mobile devices, operational status of the cells, i.e. operation mode, switched off or in sleep mode, signal strength received from the available best serving cell, and interference received from neighbor cells. In principle, neighbor cell measurements are possible only in a limited SINR range. So, the estimation of the link quality (SINR) to the next best server, in case the serving cell would be planned to be switched off, based on actual measurements is rather difficult or impossible if a mobile device is located close to the antenna of the serving cell. Also, for a sec- and example, if a cell is switched off during a low traffic period and if traffic increases, it is difficult to decide whether switching on the cell is required without being able to make link measurements to all potential serving cells based on the mobile devices.

The approach to overcome that problem and to allow calculating an optimized network configuration is to use location correlated statistically averaged values of signal strength measurements. Such values could be the existing RSRP and RSRQ measurements defined in LTE measured from the serving cell and from neighbor cells in conjunction with the test signals used in the previous embodiment. Such measurements could be performed for example according to an existing standard such as LTE. However, it is to be noted that these measurements are not performed for the pilot signals as defined by these existing standards. The measurements are performed for the test signals exchanged between the mobile devices and the base stations. Usage of the latter test signals further improves the measurement quality in comparison to the RSRP sequences. Moreover, it allows the estimation of SINR for all subcarriers. Those signals are gathered for a distinct area by a plurality of mobiles. One embodiment is that the cell coverage area is divided grid like into smaller sub-areas and that the signal strength measurements are spatially correlated, assigned and statistically processed for the corresponding sub-area. Basic idea is to build-up a data base in which such spatially correlated signal strength measurements are collected.

Figure 5:
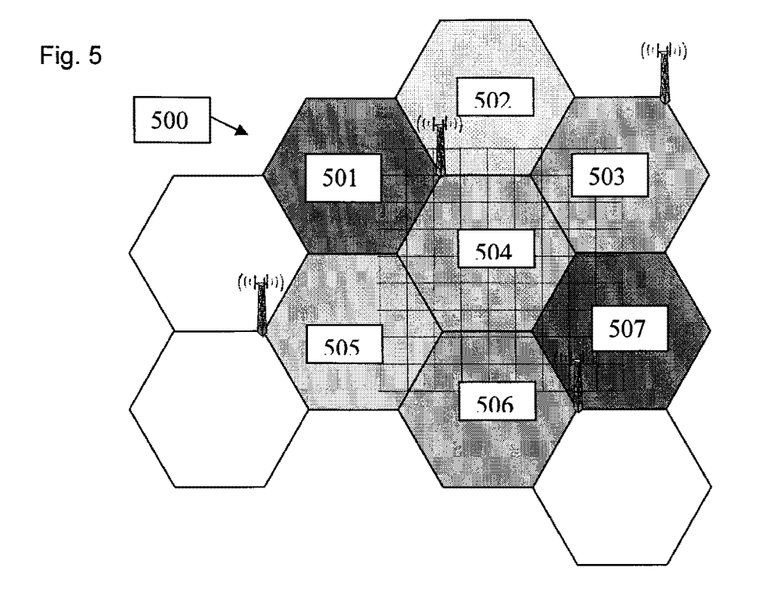
FIG. 5 is a schematic view of a plurality of cells being served by several base stations.

FIG. 5 is a schematic view of a digital cellular network 500 comprising a plurality of cells. A subset of cells 501-507 are selected for performing measurements by exchanging test signals with mobile devices in the probing mode. The grid 508 corresponds to the locations where mobile devices shall be set into the probing mode.

Figure 6:
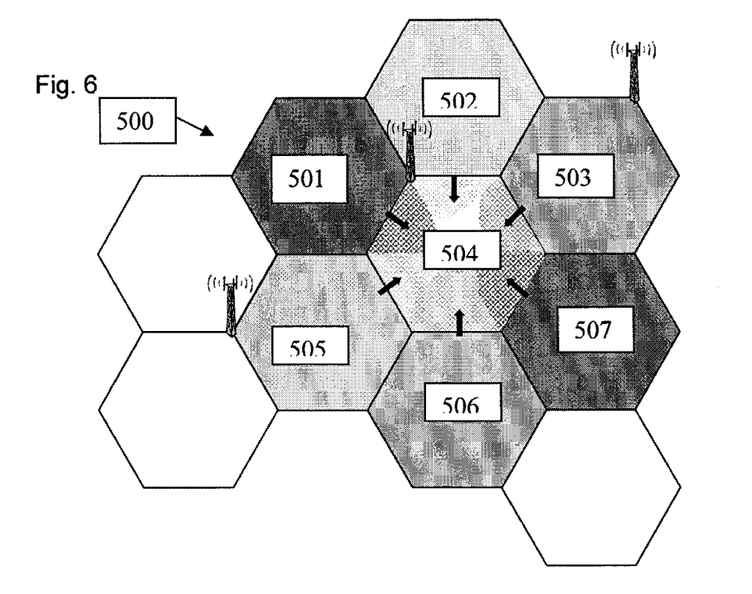
FIG. 6 is a schematic view of a plurality of cells with one cell being switched off or being switched into the sleep mode.

FIG. 6 is a schematic view of the digital cellular network 500 of FIG. 5 after it has been decided that cell 504 shall be switched off or shall be switched into the sleeping mode. This scenario may be predicted by using the average values of the measurements. The coverage area of the neighboring cells 501-503 and 505-507 extends because the cell 504 has been switched off or switched into the sleeping mode. The cell is only switched off or switched into the sleeping mode when the neighboring cells 501-503 and 505-507 have enough free resources for taking over the data connections of the mobile devices being located in the former coverage area of cell 504.

For the decision about an optimum network configuration with respect to energy consumption, preferably a ranked so called "best server list" per sub-area is generated. This allows in case that one cell is considered to be switched off to estimate whether the two criteria mentioned above are fulfilled. So, it can be checked in principle for each sub-area whether there is another compensating cell available which sufficiently provides coverage in case of switching off the considered cell (first criterion). In case the cell is not empty, i.e. when it serves users that are in connected mode, this check shall be made for each user. Then it can be checked for each neighbor cell which would have to overtake users whether the neighbor can afford the physical radio resources to serve the users to be overtaken by considering their respective data rate and demand on the quality of service (second criterion). This forecast of the needed physical resources requires the estimation of the link condition, especially the SINR, that each concerned mobile device would require from the compensating serving cell. This estimation is made on basis of the collected statistical data and comprises for example the path loss to the compensating serving cell and the path loss to interfering neighbor cells in combination with their respective transmit power. This procedure allows a worst case estimation of the SINR taking into account the large scale fading. I.e., path loss including shadow fading are considered while small scale fading or fast fading is not considered explicitly. So, a worst case estimation about the required physical resources can be made. Finally, the decision about an optimum network configuration with respect to energy consumption can be made either using a cell by cell decision strategy checking whether switching off is possible or by an e.g. utility based optimization algorithm.

Besides the data described above, the knowledge which cell is currently in operation mode and has enough free resources for taking over load of another cell is required. The calculations and decisions about an optimized network configuration can be made by central server for a larger area or for local areas or even decentralized in the base stations.

In case of a centralized approach for optimizing the network configuration, an example for the information set that has to be collected and made available in the data base is given below.
1) per sub-area:
   a) physical cell ID of the serving cell and of the neighbor cells visible within a specific sub-area
   b) location information for the sub-area
   c) statistical measure for the observed reference symbol signal strength (LTE: RSRP) or the corresponding path loss between sub-area to the transmitting antenna in combination with the knowledge about the related transmit power of the cells mentioned in a).
      Alternatively, a statistical measure for the observed link quality (LTE: RSRQ) observed within the sub-area.
   d) indication, whether sufficient statistical data is available for the respective sub-area
   e) current user density/demanded data rate (GBR/NGBR)
2) per cell:
   a) current operational status (on, off, sleep mode)
   b) maximum capacity in terms of physical resources (PRBs)
   c) possible capacity levels (e.g. for energy saving by power control)
   d) amount of unused (i.e. not scheduled) physical resources within a cell In order to collect this information, new message(s) will be introduced between base stations and central server. These messages contain information elements for a variable set of sub-areas, each of them containing again sub-area related information elements for the required information listed above in point 1). Preferably, reporting of that statistical data is made by the best server of a distinct sub-area. Cases where no unambiguous assignment of a sub-area to a best server cell is given can be treated by statistical evaluation of the data received from several cells.

For a decentralized approach with the optimization of the optimum network configuration being done within the base stations additional signaling for coordination of the cells and/or base stations are required.

| List of Reference Numerals | |
|---|---|
| 100 | Signaling network |
| 102 | Data network |
| 400 | Network management |
| 500 | digital cellular network |
| 501-507 | Cells |
| 508 | Grid |

The invention claimed is:

1. A method for performing measurements in a digital cellular wireless telecommunication network, wherein the method comprises:
   determining free resources of a set of cells of the telecommunication network, wherein the set of cells comprises a plurality of mobile devices, and wherein the free resources are usable for exchanging data between base stations of the set of cells and the plurality of mobile devices;
   determining a subset of the plurality of mobile devices;
   setting the subset of the plurality of mobile devices into a probing mode;
   determining respective locations of the subset of the plurality of mobile devices in the probing mode;
   exchanging test signals between the mobile devices in the probing mode and the base stations of the set of cells, wherein the test signals comprise first and second pilot signals, wherein the first pilot signals are orthogonal to the second pilot signals, and wherein the test signals are exchanged by using the free resources;
   performing a plurality of measurements of signal strengths and/or signal powers of the test signals;
   determining average values from the plurality of measurements; and
   storing the average values of the plurality of measurements to provide a result of the measurement.

2. The method according to claim 1, wherein the stored average values are used for predicting an effect of switching off at least one cell of the set of cells or switching the at least one cell of the set of cells from an operation mode into a sleep mode, wherein a base station of the at least one cell in the sleep mode consumes less energy than in the operation mode, wherein predicting the effect comprises:
   determining a first amount of resources needed in neighbouring cells of the at least one cell for serving the mobile devices of the at least one cell, if the at least one cell would be switched off or switched into the sleep mode, wherein determining the first amount of resources is performed by using the average values;
   determining a second amount of resources, wherein the second amount of resources comprises all free resources of the neighbouring cells;
   determining a coverage area of the at least one cell; and
   determining whether the neighbouring cells of the at least one cell would cover at least a part of the coverage area when the at least one cell is switched off by using the average values, wherein the at least a part of the coverage area is defined by mobile devices in the at least one cell having established a communication connection to the base station of the at least one cell;
   wherein the at least one cell is switched off or switched into the sleep mode if the second amount of resources comprises more resources than the first amount of resources and if the neighbouring cells cover the at least a part of the coverage area.

3. The method according to claim 1, wherein the plurality of measurements are performed for subcarriers and time slots of the telecommunication network.

4. The method according to claim 1, wherein the subset of the plurality of mobile devices is set into the probing mode by
   transmitting a request for setting each mobile device in the subset of the plurality of mobile devices into the probing mode to the subset of the plurality of mobile devices;
   determining if the probing mode is accepted by each mobile device in the subset of the plurality of mobile devices;
   transmitting an acknowledgement of the probing mode by these mobile devices that have determined to accept the probing mode; and
   setting these mobile devices that have transmitted the acknowledgement into the probing mode.

5. The method according to claim 4, wherein each of the mobile devices in the subset determines if the probing mode is accepted by taking into account its respective battery load.

6. The method according to claim 1, wherein the average values are stored in a central network entity, and wherein the central network entity performs a prediction of an effect of switching off at least one cell of the set of cells or switching the at least one cell of the set of cells from an operation mode into a sleep mode.

7. The method according to claim 6, wherein the average values are stored together with the following information:
   measurement results of the plurality of measurements;
   cell identifiers of the set of cells;
   signal powers received at the base stations of the set of cells from the subset of the plurality of mobile devices;
   information about how many measurements have been performed for determining the average values, wherein the average values are not used for predicting the effect of switching off the at least one cell of the set of cells or switching the at least one cell of the set of cells from the operation mode into the sleep mode, if the number of measurements is below a reliability value for the respective locations of the subset of the plurality of mobile devices;
   traffic loads for each cell of the set of cells; and
   maximum traffic loads for each cell of the set of cells.

8. The method according to claim 1, wherein the average values are stored in the base stations of the set of cells, and wherein these base stations of the set of cells perform a simulation of switching off at least one cell of the set of cells or switching the at least one cell of the set of cells from an operation mode into a sleep mode.

9. The method according to claim 1, wherein determining the respective locations of the subset of the plurality of mobile devices in the probing mode is performed by using satellite navigation data and/or by positioning methods based on data of the telecommunication network.

10. The method according to claim 1, wherein the set of cells is determined dynamically.

11. A central network entity for a digital cellular wireless telecommunication network, wherein the central network entity is configured to:
   communicate with base stations of a digital cellular wireless telecommunication network;
   determine free resources of a set of cells of the telecommunication network, wherein the set of cells comprises a plurality of mobile devices, and wherein the free resources are usable for exchanging data between base stations of the set of cells and the plurality of mobile devices;
   determine a subset of the plurality of mobile devices;
   control setting the subset of the plurality of mobile devices into a probing mode;
   determine respective locations of the subset of the plurality of mobile devices in the probing mode;
   control exchange of test signals between the mobile devices in the probing mode and the base stations of the set of cells, wherein the test signals comprise first and second pilot signals, wherein the first pilot signals are orthogonal to the second pilot signals, and wherein the test signals are exchanged by using the free resources;
   control performance of a plurality of measurements of signal strengths and/or signal powers of the test signals;
   determine average values of the plurality of measurements;
   store the average values of the plurality of measurements.

12. The central network entity according to claim 11, wherein the central network entity is configured to perform a prediction of an effect of switching off at least one cell of the set of cells or switching the at least one cell of the set of cells from an operation mode into a sleep mode.

13. The central network entity according to claim 12, wherein the central network entity is configured to store the following information:
   measurement results of the plurality of measurements;
   cell identifiers of the set of cells;
   signal powers received at the base stations of the set of cells from the subset of the plurality of mobile devices;
   information about how many measurements have been performed for determining the average values, wherein the average values are not used for predicting the effect of switching off the at least one cell of the set of cells or switching the at least one cell of the set of cells from the operation mode into the sleep mode, if the number of measurements is below a reliability value for the respective locations of the subset of the plurality of mobile devices;
   traffic loads for each cell of the set of cells; and
   maximum traffic loads for each cell of the set of cells.

14. A base station for a digital cellular wireless telecommunication network, wherein the base station is configured to:
   communicate with mobile devices of a digital cellular wireless telecommunication network; and
   communicate with other base stations of the telecommunication network;
   form a cell of the telecommunication network that belongs to a set of neighbouring cells formed by a corresponding set of neighbouring base stations;
   in cooperation with other neighbouring base stations, determine free resources of the set of neighbouring cells of the telecommunication network, wherein the set of neighbouring cells comprises a plurality of mobile devices, and wherein the free resources are usable for exchanging data between the neighbouring base stations of the set of neighbouring cells and the plurality of mobile devices;
   determine a subset of the plurality of mobile devices;
   set the subset of the plurality of mobile devices into a probing mode;
   determine respective locations of the subset of the plurality of mobile devices in the probing mode;
   receive test signals from the mobile devices in the probing mode, wherein the test signals comprise first and second pilot signals, wherein the first pilot signals are orthogonal to the second pilot signals, and wherein the test signals are received by using the free resources;
   perform a plurality of measurements of signal strengths and/or signal powers of the test signals;
   determine average values of the plurality of measurements;
   store the average values of the plurality of measurements.

15. The base station according to claim 14, wherein the base station is configured to use the stored average values for predicting an effect of switching off at least one cell of the set of neighbouring cells or switching the at least one cell of the set of neighbouring cells from an operation mode into a sleep mode;
   wherein the base station, in cooperation with the other neighbouring base stations, is configured to determine a first amount of resources needed in the set of neighbouring cells for serving the mobile devices of the at least one cell, if the at least one cell would be switched off or switched into the sleep mode, wherein determining the first amount of resources is performed by using the average values;
   wherein the base station, in cooperation with the other neighbouring base stations, is configured to determine a second amount of resources, wherein the second amount of resources comprises all free resources of the set of neighbouring cells;

wherein the base station, in cooperation with the other neighbouring base stations, is configured to determine a coverage area of the at least one cell;

wherein the base station, in cooperation with the other neighbouring base stations, is configured to determine whether the set of neighbouring cells of the at least one cell would cover at least a part of the coverage area when the at least one cell is switched off by using the average values, wherein the at least a part of the coverage area is defined by mobile devices in the at least one cell having established a communication connection to the base station of the at least one cell;

wherein the base station, in cooperation with the other neighbouring base stations, is configured to switch the at least one cell off or into the sleep mode if the second amount of resources comprises more resources than the first amount of resources and if the neighbouring cells cover the at least a part of the coverage area.

16. The base station according to claim 14, wherein the base station is configured to set the subset of the plurality of mobile devices into the probing mode by:
   transmitting a request for setting each mobile device in the subset of the plurality of mobile devices into the probing mode to the subset of the plurality of mobile devices;
   determining if the probing mode is accepted by each mobile device in the subset of the plurality of mobile devices;
   receiving an acknowledgement of the probing mode by these mobile devices that have determined to accept the probing mode; and
   setting these mobile devices that have transmitted the acknowledgement into the probing mode.

17. The base according to claim 14, wherein the base station, in cooperation with the other neighbouring base stations, is configured to perform a simulation of switching off at least one cell of the set of neighbouring cells or switching the at least one cell of the set of neighbouring cells from an operation mode into a sleep mode.

18. A mobile device for use in a digital cellular wireless telecommunication network, wherein the mobile device is configured to:
   at least
   a transmitter configured to communicate with base stations of a digital cellular wireless telecommunication network;
   wherein, when the telecommunication network is operating to serve a load for a set of cells formed by a corresponding set of base stations, there are used resources of the set of cells serving the load and free resources of the set of cells known by the telecommunication network to be free, wherein the set of cells comprises the mobile device and other mobile devices, wherein the free resources are usable for exchanging data between the base stations of the set of cells and the mobile device;
   wherein the mobile device is configured to set itself into a probing mode;
   wherein the mobile device is configured to determine its location within the set of cells;
   wherein, in the probing mode, the mobile device is configured to receive test signals broadcast by the base stations of the set of cells, wherein the test signals comprise first and second pilot signals, wherein the first pilot signals are orthogonal to the second pilot signals, and wherein the test signals are received by using the free resources;
   wherein, in the probing mode, the mobile device is configured to perform a plurality of measurements of signal strengths and/or signal powers of the test signals;
   wherein, in the probing mode, the mobile device is configured to send the plurality of measurements and a reliability indicator to the base stations of the set of cells.

19. The mobile device according to claim 18, wherein the mobile device is configured to receive a request signal broadcast by the base stations of the set of cells requesting the mobile device to enter the probing mode;
   wherein the mobile device is configured to check device parameters to decide whether to accept or deny the probing mode request;
   wherein, after deciding to accept the probing mode request, the mobile device is configured to set itself into the probing mode and determine its location;
   wherein, after deciding to accept the probing mode request, the mobile device is configured to send a feedback signal indicating acceptance to at least one base station of the base stations of the set of cells.

20. The mobile device according to claim 18, wherein the mobile device is configured to determine if the probing mode is accepted by taking into account a battery load for the mobile device.

21. The mobile device according to claim 18, wherein the mobile device is configured to determine its location using satellite navigation data and/or by positioning methods based on data of the telecommunication network.

22. The mobile device according to claim 18, wherein, in the probing mode, the mobile device is configured to broadcast uplink test signals for reception by base stations of the set of cells.

* * * * *